United States Patent
Viklund et al.

(10) Patent No.: US 10,399,156 B2
(45) Date of Patent: Sep. 3, 2019

(54) TOOL, A CUTTING INSERT AND A COMPACTED POWDER PART

(71) Applicant: SANDVIK INTELLECTUAL PROPERTY AB, Sandviken (SE)

(72) Inventors: Per Viklund, Gavle (SE); Ralf Lehto, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/737,790

(22) PCT Filed: Jun. 8, 2016

(86) PCT No.: PCT/EP2016/062950
§ 371 (c)(1),
(2) Date: Dec. 19, 2017

(87) PCT Pub. No.: WO2017/005440
PCT Pub. Date: Jan. 12, 2017

(65) Prior Publication Data
US 2018/0243844 A1  Aug. 30, 2018

(30) Foreign Application Priority Data
Jul. 3, 2015 (EP) .................................. 15175239

(51) Int. Cl.
*B23C 5/02* (2006.01)
*B23C 5/06* (2006.01)
(Continued)

(52) U.S. Cl.
CPC ............... *B23C 5/06* (2013.01); *B22F 5/106* (2013.01); *B22F 7/062* (2013.01); *B23C 5/2221* (2013.01);
(Continued)

(58) Field of Classification Search
CPC . B22F 3/02; B22F 7/06; B23B 27/141; B23B 2200/3681; B23B 2200/165
See application file for complete search history.

(56) References Cited

U.S. PATENT DOCUMENTS 5,275,633 A * 1/1994 Johansson ................. B22F 3/02
51/293
6,342,301 B1 * 1/2002 Yoshida .................... B01J 3/062
427/372.2
(Continued)

FOREIGN PATENT DOCUMENTS

| AT | 6851 U1 | 5/2004 |
| EP | 0365505 A1 | 4/1990 |

(Continued)

*Primary Examiner* — Willmon Fridie, Jr.
(74) *Attorney, Agent, or Firm* — Corinne R. Gorski

(57) ABSTRACT

A tool for chip-removing machining including a tool body and at least one cutting insert mounted in an insert seat of the tool body. The cutting insert includes an upper side and a lower side directed toward a bottom contact surface of the insert seat. The cutting insert is formed by sintering together two compacted powder parts, one of the parts forming an upper part and the other forming a lower part. An imaginary plane is defined between the lower and upper parts. A side surface extends between the upper and lower sides around the periphery of the cutting insert, and at least one cutting edge is formed in a transition between the upper side and the side surface. The tool is configured so that the tool body contacts the side surface of the cutting insert only above the imaginary plane along an upper part of the side surface.

20 Claims, 8 Drawing Sheets

(51) Int. Cl.
  *B23C 5/22* (2006.01)
  *B22F 7/06* (2006.01)
  *B22F 5/10* (2006.01)
  *B22F 5/00* (2006.01)
(52) U.S. Cl.
  CPC ............ *B22F 5/10* (2013.01); *B22F 2005/001* (2013.01); *B23B 2200/3681* (2013.01); *B23C 2200/0488* (2013.01); *B23C 2200/128* (2013.01); *B23C 2210/168* (2013.01)

(56) References Cited

U.S. PATENT DOCUMENTS

| | | | |
|---|---|---|---|
| 9,744,597 B2* | 8/2017 | Wernh | B23B 27/145 |
| 9,925,596 B2* | 3/2018 | Johansson | B23B 27/143 |
| 2006/0165828 A1* | 7/2006 | Smilovici | B22F 3/03 |
| | | | 425/78 |
| 2008/0226943 A1* | 9/2008 | Fang | C22C 1/051 |
| | | | 428/697 |
| 2010/0266354 A1* | 10/2010 | Zitzlaff | B23B 27/145 |
| | | | 407/113 |
| 2013/0129432 A1* | 5/2013 | Jaeger | B23C 5/207 |
| | | | 407/42 |
| 2013/0195567 A1* | 8/2013 | Sunnvius | B23C 5/06 |
| | | | 407/40 |
| 2013/0195569 A1* | 8/2013 | Gey | B28B 1/002 |
| | | | 407/113 |
| 2014/0030034 A1* | 1/2014 | Lehto | B23C 5/06 |
| | | | 407/40 |
| 2015/0251251 A1* | 9/2015 | Hoffer | B22F 3/12 |
| | | | 407/119 |
| 2017/0189972 A1* | 7/2017 | Matsumura | B23C 5/06 |
| 2018/0243844 A1* | 8/2018 | Viklund | B23C 5/06 |

FOREIGN PATENT DOCUMENTS

| | | |
|---|---|---|
| EP | 2596889 A1 | 5/2013 |
| EP | 2614910 A1 | 7/2013 |
| EP | 2620243 A1 | 7/2013 |
| JP | H05285708 A | 11/1993 |
| WO | 2014021250 A1 | 2/2014 |
| WO | 2014081011 A1 | 5/2014 |

\* cited by examiner

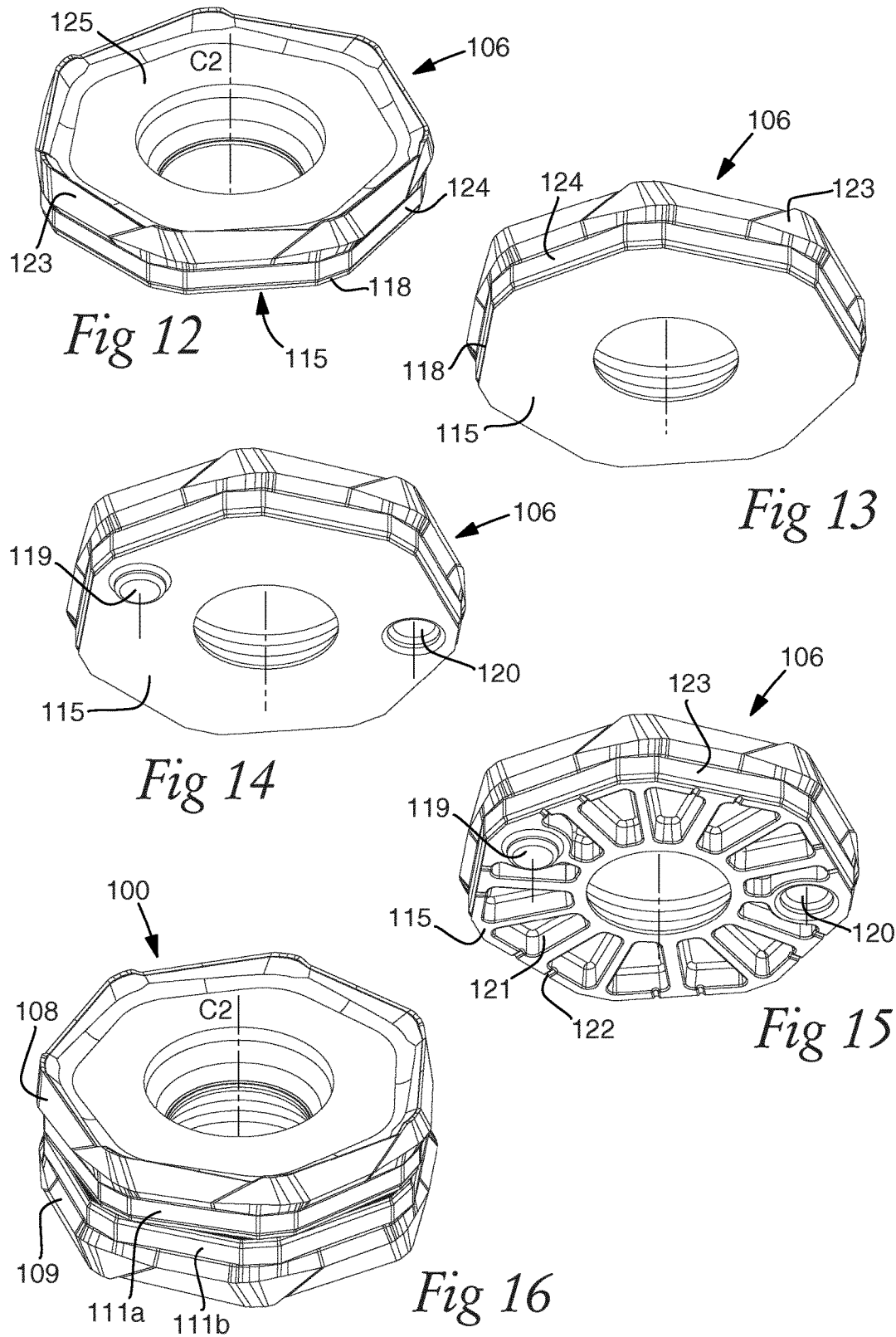

TOOL, A CUTTING INSERT AND A COMPACTED POWDER PART

RELATED APPLICATION DATA

This application is a § 371 National Stage Application of PCT International Application No. PCT/EP2016/062950 filed Jun. 8, 2016 claiming priority to EP Application No. 15175239.1 filed Jul. 3, 2015.

FIELD OF THE INVENTION

The present invention relates to a tool for chip-removing machining including a tool body and at least one cutting insert, a cutting insert, and a compacted powder part. In particular, but not exclusively, the invention relates to a milling tool, a cutting insert for use in a milling tool, and a compacted powder part forming an upper part of such a cutting insert.

In the present disclosure, a positive cutting insert is a cutting insert for which a clearance surface below a cutting edge is formed at a sharp inner angle with respect to an upper extension plane of the cutting insert. In other words, the clearance surface is inclined inwards from an upper side of the cutting insert. A negative cutting insert is a cutting insert for which the clearance surface is formed at a right inner angle or at an obtuse inner angle with respect to said plane. In other words, the clearance surface is extending at right angle or inclined outwards from the upper side of the cutting insert.

A compacted powder part is herein to be understood as a part that is manufactured from powder and various additives, such as binders, deflocculates and lubricants, and compacted under high pressure.

BACKGROUND AND PRIOR ART

Tools for chip-removing machining of metal workpieces are generally composed of a rotatable tool body and a plurality of replaceable cutting inserts made of cemented carbide, ceramics, or other hard material. Since the cutting inserts are subjected to significant wear upon use in the tool, it is desirable for the insert to have as many edges as possible in order to prolong the service life of the cutting insert. Cutting inserts are therefore often made double-sided with cutting edges formed along both an upper side and a lower side of the insert, thus doubling the number of cutting edges per insert.

Double-sided cutting inserts may however have complicated geometries that make them difficult to manufacture using simple pressing processes, in particular uniaxial pressing processes. Instead, more advanced multi-axial pressing processes may be needed, increasing the complexity and cost of producing the cutting inserts. In order to overcome this problem, manufacturing methods have been developed in which the cutting insert is pressed by a uniaxial pressing of separate upper and lower compacted powder parts, which thereafter are sintered together to form a double-sided cutting insert.

EP0365505 discloses a cutting insert manufactured from two compacted powder parts sintered together. Each of the compacted powder parts is provided with a set of engagement members for preventing relative motion of the parts before sintering the parts together.

WO2014081011 discloses a tool for chip-removing machining and a cutting insert for mounting in such a tool, wherein the cutting insert is made by sintering two compacted powder parts together. The cutting insert is double-sided and provided with a waist shaped side surface, so that it has a positive basic shape. Each of the compacted powder parts is provided with a set of engagement members for preventing relative motion of the parts.

Although the separate compacted powder parts disclosed in EP0365505 and WO2014081011 are provided with engagement members, cutting inserts that are manufactured from two compacted powder parts that are sintered together tend to have geometrical imperfections. Such imperfections arise from slight misalignments of the two parts forming the cutting insert, as well as from errors arising from sintering. The symmetry of the cutting insert is thereby affected and when mounted in an insert seat of a tool body, it is difficult to achieve a precise positioning of the cutting insert. One way of compensating for such imperfections is to grind the cutting insert after sintering, but this is a costly and time consuming procedure which increases the final cost of the cutting insert. Furthermore, grinding increases the amount of waste material produced during production and which is difficult to renew. It is therefore desirable to find solutions by means of which cutting inserts that are formed from two parts sintered together can be used in tools for chip-removing machining, without additional grinding, after sintering.

SUMMARY OF THE INVENTION

It is a primary objective of the present invention to provide a solution by means of which the above mentioned problems can be overcome. In particular, it is an objective to provide a tool for chip removing machining in which cutting inserts that are formed by sintering together two parts can be used directly after sintering, without additional grinding operations and without compromising the precision in the positioning of the cutting insert and the stability of the cutting insert when mounted in a tool body. Another objective is to provide a cutting insert which is manufactured by sintering two compacted powder parts together and which is suitable for use in a tool for chip-removing machining without additional grinding operations.

At least the primary objective is achieved by means of a tool for chip-removing machining, comprising:
- a tool body including a front end and a rear end, between which a central rotation axis extends around which the tool is rotatable in a direction of rotation, and at least one insert seat being formed in a transition between the front end and an envelope surface extending between the front end and the rear end of the tool body, the at least one insert seat comprising a bottom contact surface;
- at least one cutting insert securely mounted in the at least one insert seat, comprising:
  an upper side and an opposite lower side between which a centre axis extends, wherein the lower side comprises a bottom support surface directed toward the bottom contact surface of the insert seat, wherein the upper side comprises a rake face, and wherein the cutting insert is formed by sintering together two compacted powder parts, one of the parts after sintering forming an upper part and the other one forming a lower part, an imaginary plane perpendicular to the centre axis being defined between the lower part and the upper part,
  a side surface extending between the upper side and the lower side around the periphery of the cutting insert, and
  at least one cutting edge formed in a transition between the upper side and the side surface.

The tool is characterised in that it is configured so that the tool body contacts the side surface of the cutting insert only above the imaginary plane of the cutting insert along an upper part of its side surface.

The tool according to the invention is configured so that a cutting insert mounted therein is only supported in an axial and a radial direction of the tool along its upper part, on which also the active cutting edge is located. Thus, the lower part of the cutting insert is only in contact with the tool body along its bottom support surface while a clearance is provided around the lower part of the side surface. This means that the function of the lower part of the cutting insert, when mounted in the tool body, is that of a shim. Slight misalignments between the upper part and the lower part thereby do not affect the positioning of the cutting insert within the tool body. In other words, no costly and time consuming grinding operations need to be carried out before using the sintered cutting inserts in the tool. The cost-efficiency of the manufacturing process can thereby be improved without compromising the tolerances of the final tool.

According to one embodiment of this aspect of the invention, the side surface of the cutting insert is waist shaped with a waist centred on said imaginary plane. The waist-shaped side surface can be either in the form of an angled surface, so that a cross sectional area of the cutting insert gradually decreases toward the imaginary plane, such as for a double-sided positive cutting insert. It may also be in the form of side surface in which a discrete recess is formed, e.g. in case of a double-sided negative cutting insert. The waist provides clearance in the case of double-sided positive cutting inserts and can in the case of double-sided negative cutting inserts be used to elongate support surfaces used to support the cutting insert in the tool body, as further described below.

According to one embodiment of this aspect of the invention, the tool body is provided with an axial contact surface and a radial contact surface configured to support the cutting insert along the upper part of its side surface. One axial and one radial contact surface are sufficient to fully support the cutting insert together with the bottom contact surface during operation of the tool, regardless of the shape of the cutting insert.

According to one embodiment of this aspect of the invention, the side surface of the cutting insert is provided with a recess centred on said imaginary plane and extending around the circumference of the cutting insert, and the contact surfaces of the tool body are configured to contact the cutting insert along at least one support surface provided within said recess. For example, the cutting insert can be formed as a double-sided negative cutting insert in this embodiment. By providing the support surfaces within the recess, their length may be increased so that the total support surface area is increased, in particular for a cutting insert having a large number of cutting edges along the upper side. The recessed support surfaces, which may be rounded or planar, thereby serve to improve the localisation of the cutting insert in the insert seat of the tool body, and to prevent rotation of the cutting insert within the insert seat. Placing the support surfaces in the recess also gives more freedom to design the clearance surface independently of the support surfaces. Moreover, if a failure occurs in the active cutting edge during operation of the tool, the recess helps isolating the failure to the cutting edge without affecting the rest of the cutting insert.

According to one embodiment of this aspect of the invention, said recess has a width of 10-80%, preferably 25-60%, of the height h of the cutting insert as measured between the upper side and the lower side. The height h of the cutting insert is also referred to as the thickness of the cutting insert. The desirable width of the recess depends on the total height/thickness of the cutting insert. A recess which is too wide reduces the strength of the cutting insert while a too narrow recess does not leave enough space for the support surface. The recess should preferably have a depth of at least 0.1 mm. The maximum depth of the recess depends on the size of the cutting insert, since a too deep recess in relation to the size of the cutting insert impairs the strength of the cutting insert. The depth of the recess should therefore preferably not exceed 10% of the diameter of the largest inscribed circle (IC) that will fit inside the cutting insert or touch all edges of the insert.

According to one embodiment of this aspect of the invention, a groove is provided in the side surface of the cutting insert, centred on said imaginary plane and extending around the circumference of the cutting insert. The groove ensures that a clearance is provided between the groove and the tool body, so that the lower part of the cutting insert is not in contact with the tool body, even if the tool body comprises a contact surface that reaches past the imaginary plane separating the upper part of the side surface from the lower part. For this purpose, it is preferable that the groove is continuous and reaches all the way around the cutting insert. Misalignments and sintering errors arising during production of the cutting inserts are "hidden" in the groove and thereby do not affect the positioning of the cutting insert within the tool body.

According to one embodiment of this aspect of the invention, said groove has a width of between 0.1 mm-20% of the height h of the cutting insert, preferably 0.2 mm-10% of said height. With a width of at least 0.1 mm, it is ensured that the desired effect is achieved. By not exceeding 20%, preferably 10%, of the height h, i.e. thickness, of the cutting insert, enough space is left for support surfaces formed above the groove. The groove has a depth of between 0.05 mm-10% of the size of the cutting insert, preferably 0.05 mm-2% of the size of the cutting insert. The size of the cutting insert is here defined as the diameter of the largest inscribed circle (IC) that will fit inside the cutting insert or touch all edges of the insert.

According to one embodiment of this aspect of the invention, said imaginary plane extends halfway between the upper side and the lower side of the cutting insert. Thus, the upper part and the lower part are equally thick, which simplifies production of the cutting insert and which also contributes to a precise positioning in the tool body for double-sided cutting inserts.

According to another aspect of the invention, at least the primary objective defined above is achieved by a cutting insert for mounting in a tool for chip removing machining, comprising
- an upper side and an opposite lower side between which a centre axis extends, wherein the upper side comprises a rake face and wherein the lower side comprises a bottom support surface for contacting a bottom contact surface of a tool body,
- a side surface extending between the upper side and the lower side around the periphery of the cutting insert, and
- at least one cutting edge formed in a transition between the upper side and the side surface,
wherein the cutting insert is formed by sintering together two compacted powder parts, one of the compacted powder parts after sintering forming an upper part and the other one forming a lower part, an imaginary plane perpendicular to the centre axis being defined between the lower part and the upper part.

The cutting insert is characterised in that a groove is provided in the side surface, centred on said imaginary plane and extending around the circumference of the cutting insert.

The cutting insert according to the invention comprises a groove, which makes it possible to mount the cutting insert in a tool body with a clearance provided between a lower part of the side surface of the cutting insert and the tool body. Thanks to this clearance, possible sintering errors and misalignments between the upper part and the lower part do not affect the positioning of the cutting insert within the tool body. Thus, the need for grinding the cutting insert after sintering is eliminated and the manufacturing process is thereby fast and cost-efficient.

Further embodiments of this aspect of the invention are defined in the dependent claims. Advantages and advantageous features of those embodiments are described above in connection with the proposed tool.

If provided with a recess, the recess should preferably have a depth of at least 0.1 mm and a maximum depth as discussed above.

According to one embodiment of this aspect of the invention, said recess comprises a plurality of support surfaces configured to make contact with contact surfaces provided in a tool body, said support surfaces being formed at an angular deviation from the centre axis of maximum ±15°. This ensures a stable support when the cutting insert is mounted in a tool body. Preferably, the support surfaces extend in parallel or essentially in parallel with the centre axis.

According to one embodiment of this aspect of the invention, the cutting insert is provided with at least one internal cavity, so that the cutting insert is at least partly hollow. The internal cavity decreases the amount of material needed for making the cutting insert and thereby reduces the weight of the insert. The reduced weight in turn reduces transporting costs and environmental impacts.

According to one embodiment of this aspect of the invention, at least one channel is provided from each of said at least one cavity, said channel having an orifice in the side surface or in an inner circumferential surface delimiting a central through-hole formed in the cutting insert. The channel or channels are used for pressure equalising during sintering at elevated temperatures and may prevent the formation of cracks in the cutting insert.

According to one embodiment of this aspect of the invention, the cutting insert is double-sided with the lower side identical to the upper side. This doubles the number of usable cutting edges and thus also doubles the service life in comparison with a single-sided cutting insert.

According to another aspect of the invention, at least the primary objective defined above is achieved by a compacted powder part corresponding to an upper part of the proposed cutting insert, comprising:
- a top side and an interface side between which a centre axis extends, wherein the top side is intended to form an upper side of the cutting insert, and wherein the interface side is intended to abut an interface side of a corresponding compacted powder part,
- a peripheral surface extending between the top side and the interface side, wherein the compacted powder part comprises a circumferential step formed in a transition between the peripheral surface and the interface side, so that a circumference of the cutting insert below the step at the interface side is smaller than a circumference above the step.

The step provided in the side surface of the compacted powder part ensures that the final cutting insert after sintering is formed with a groove extending around the circumference of the cutting insert between the upper part and the lower part, thus offering the advantages discussed above.

According to one embodiment of this aspect of the invention, the interface side is flat. With a flat interface side without engagement members, it is possible to achieve a sufficient precision in the positioning of the two compacted powder parts using modern robot technology. The lack of engagement members eliminates the risk of problems caused by misplacement and mismatching engagement members on the compacted powder parts during positioning of the interface sides against each other by the robot.

According to one embodiment of this aspect of the invention, the interface side is formed with at least one engagement member configured to engage with a corresponding engagement member of a corresponding compacted powder part such as to prevent relative movement of the two compacted powder parts. The engagement members hold the parts together until they are sintered, and thus prevent separation of the parts due to e.g. vibrations prior to sintering.

Further advantageous features and advantages of the invention will appear from the following detailed description.

BRIEF DESCRIPTION OF THE DRAWINGS

The invention will in the following be described by means of example with reference to the appended drawings, in which:

FIG. 12 shows a perspective view of a compacted powder part for forming the cutting insert shown in FIG. 1, FIG. 13 shows a perspective view of a compacted powder part according to an embodiment of the invention, FIG. 14 shows a perspective view of a compacted powder part according to another embodiment of the invention, FIG. 15 shows a perspective view of a compacted powder part according to yet another embodiment of the invention, and FIG. 16 shows a perspective part of a cutting insert such as in FIG. 1 having misaligned upper and lower parts.

DETAILED DESCRIPTION OF EMBODIMENTS OF THE INVENTION

Figure 1:
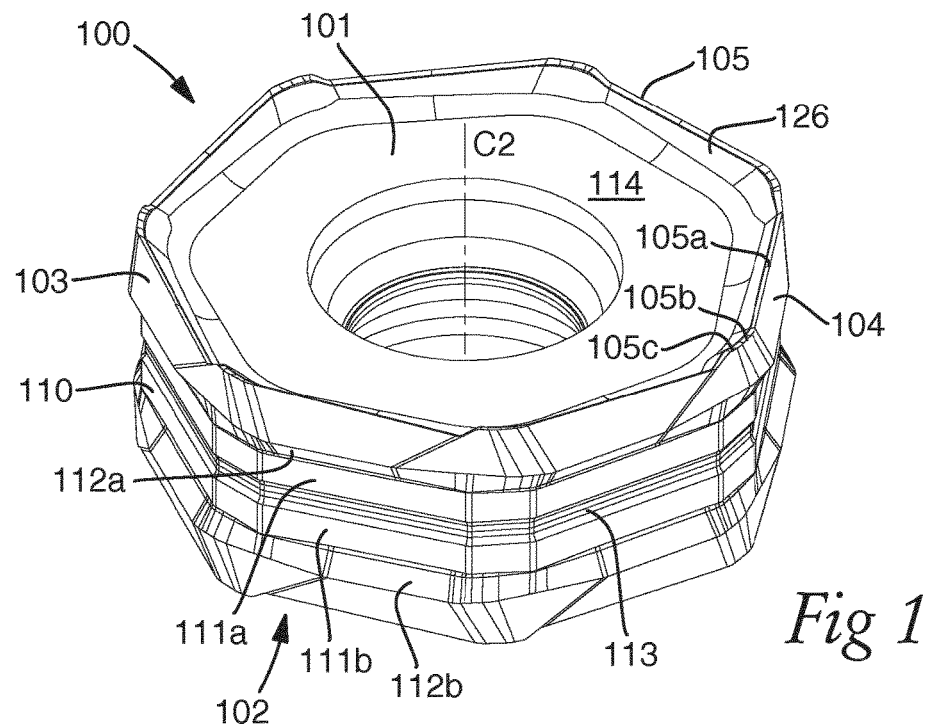
FIG. 1 shows a perspective view of a cutting insert according to a first embodiment of the invention.
Figure 2:
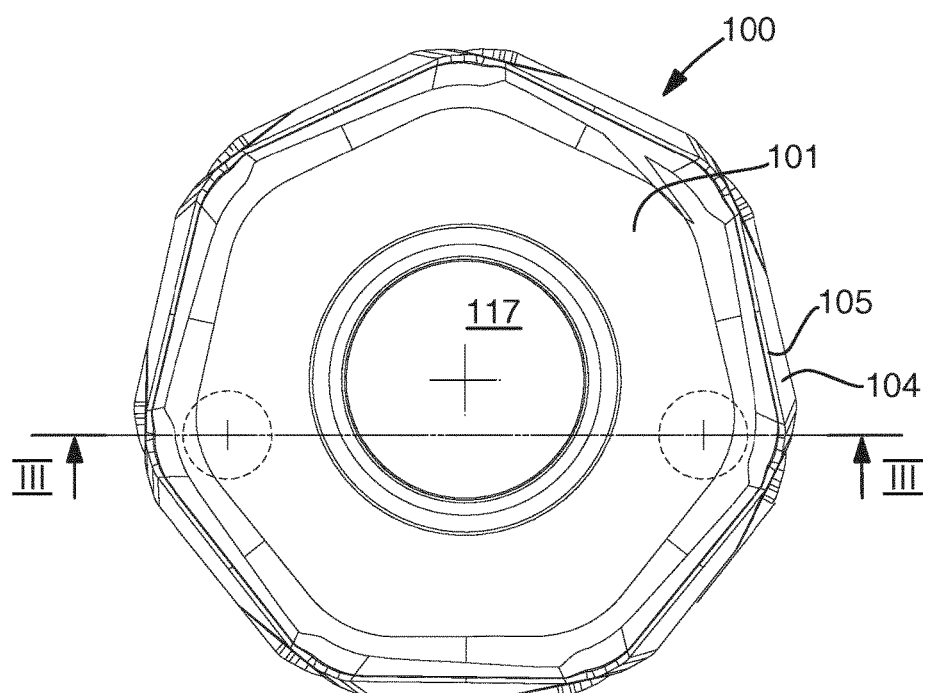
FIG. 2 shows a top view of the cutting insert in FIG. 1.
Figure 3:
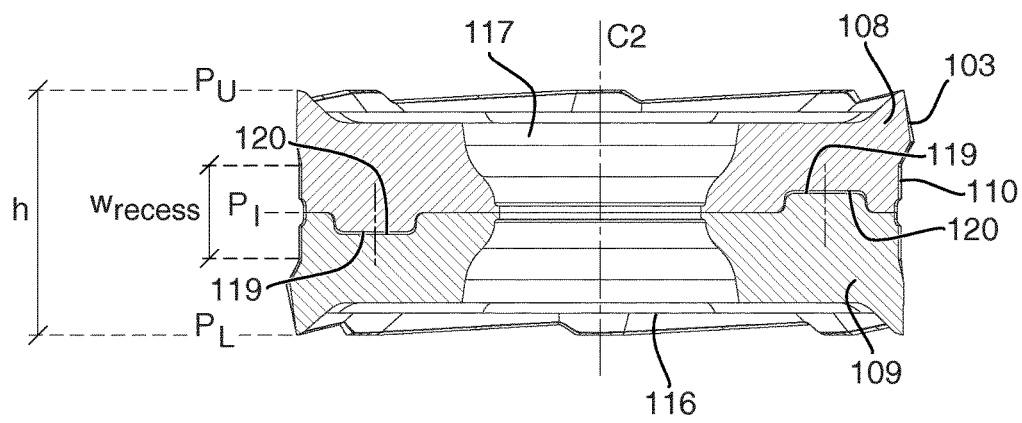
FIG. 3 shows a cross section along the line III-III in FIG. 2.

A cutting insert 100 according to a first embodiment of the invention is shown in FIG. 1-3. The cutting insert is double-sided and negative with a polygonal basic shape and comprises an upper side 101 defining an upper extension plane $P_U$ and an identical lower side 102 defining a lower extension plane $P_L$, which is parallel to the upper extension plane $P_U$. A centre axis C2 extends perpendicularly through the upper extension plane $P_U$ and the lower extension plane $P_L$. The upper side 101 and the lower side 102 are connected by a side surface 103, which comprises several clearance surfaces 104. Around the upper side, seven identical and alternately usable cutting edges 105 extend in a transition between the side surface and the upper side. Likewise, cutting edges extend around the lower side of the cutting insert.

Figure 4:
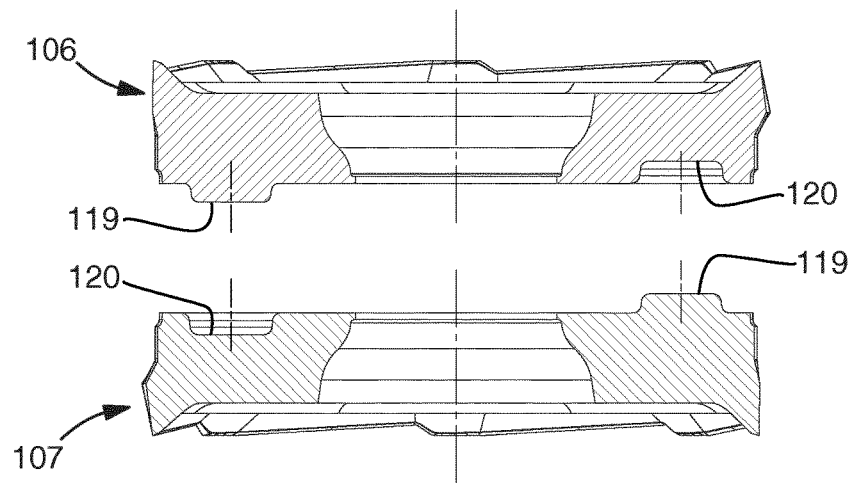
FIG. 4 shows an exploded view of the cutting insert in FIG. 3.

The cutting insert according to the invention is formed by sintering together two compacted powder parts 106, 107 as shown in FIG. 4, which will be further discussed below. In the shown embodiment, the two compacted powder parts 106, 107 are identical. After sintering, one of the parts 106 forms an upper part 108 and the other part 107 forms an identical lower part 109 of the cutting insert. Between the lower part 109 and the upper part 108, halfway between the upper side 101 and the lower side 102, an imaginary plane $P_I$ extends, perpendicularly to the centre axis C2. The side surface 103 is waist shaped with a waist centred on said imaginary plane $P_I$. In the first embodiment, the waist is in the form of a recess 110 formed in the side surface 103 and extending around the circumference of the cutting insert 100. The recess 110 here comprises flat or essentially flat support surfaces 111a, 111b parallel with the centre axis C2 on both sides of the imaginary plane $P_I$. The support surfaces 111a, 111b are intended to contact axial and radial contact surfaces of a tool body in which the cutting insert is mounted, which will be explained in detail in the following. Inclined transition surfaces 112a, 112b delimit the recess 110 and connect it to the clearance surfaces 104.

Furthermore, a groove 113 is formed in the recess 110, centred on the imaginary plane $P_I$. The groove 113 extends around the circumference of the cutting insert 100. The recess 110, including the groove 113 and the flat support surfaces 111a, 111b on both sides of the groove 113, but not the inclined transition surfaces 112a, 112b, has a width $w_{recess}$ of about 40% of the total height h of the cutting insert 100 as measured from the upper extension plane $P_U$ to the lower extension plane $P_L$.

In the first embodiment, each cutting edge 105 comprises an essentially rectilinear chip removing main cutting edge portion 105a and a first and a second secondary cutting edge portion 105b, 105c formed as surface-wiping edges. The first secondary cutting edge portion 105b is here configured to act as a surface-wiping secondary edge when the cutting insert is mounted in a milling tool with a first entering angle K which is relatively small. If instead the cutting insert 100 is mounted in a milling tool with a second entering angle K, larger than the first one, the first secondary cutting edge portion 105b acts as a corner edge, while the second secondary cutting edge portion 105c at this entering angle is configured to act as a surface-wiping secondary edge. Thus, the milling insert according to this embodiment can be used for two different entering angles.

The cutting insert 100 further comprises a recessed upper base surface 114 extending in parallel with the upper extension plane $P_U$. An upper rake face 126 extends in the region between the upper cutting edges 105 and the upper base surface 114. The lower side 102 comprises a bottom support surface 116 configured to rest against a bottom contact surface in a tool body, as will be described in detail below.

The cutting insert 100 is further provided with a screw hole 117 for receiving a screw used to mount the cutting insert in a tool body. Alternative means for mounting may of course be used, thus eliminating the need for a screw hole.

The cutting insert 100 is indexable to different index positions. In one index position, one of the upper cutting edges 105 is cutting, wherein the bottom support surface 116 rests on a bottom contact surface of an insert seat of a milling tool body. In another index position, one of a number of lower cutting edges extending around the lower side 102 is cutting, wherein the upper side rests on the bottom contact surface of the insert seat.

Figure 5:
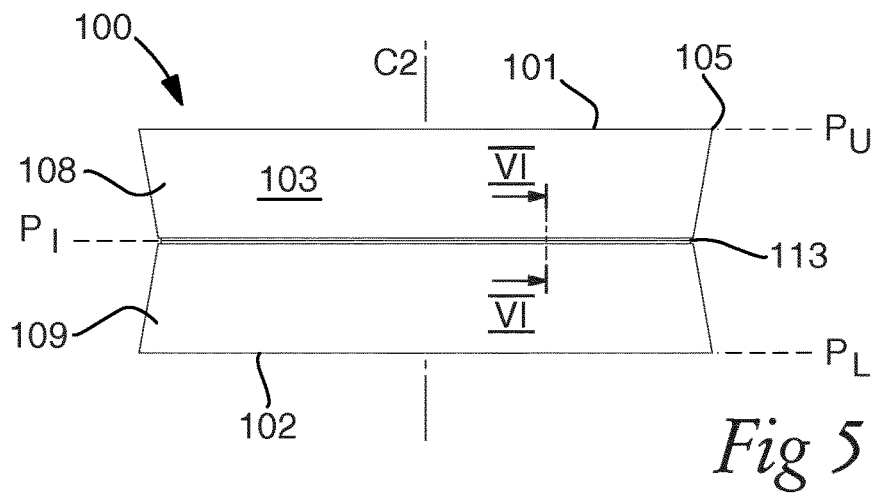
FIG. 5 shows a side view of a cutting insert according to a second embodiment of the invention.
Figure 6:
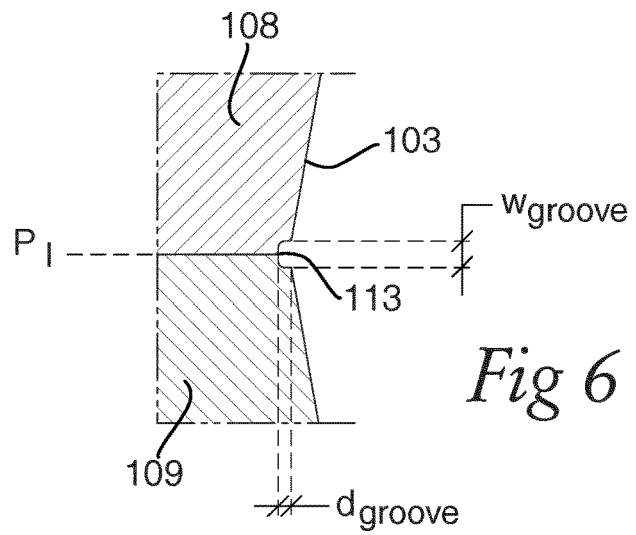
FIG. 6 shows a detailed cross section along the line VI-VI in FIG. 5.

A cutting insert 100 according to a second embodiment of the present invention is shown in FIG. 5-6. It is to be noted that the same reference sign designates the same or a similar element in all embodiments disclosed. In this embodiment, the cutting insert 100 is a positive double-sided cutting insert. It has a circular upper side 101 defining an upper extension plane $P_U$ and an identical lower side 102 defining a lower extension plane $P_L$, which is parallel to the upper extension plane $P_U$. A centre axis C2 extends perpendicularly through the upper extension plane $P_U$ and the lower extension plane $P_L$. The upper side 101 and the lower side 102 are connected by a side surface 103. Around the upper side 101, a circular cutting edge 105 extends. The cutting insert 100 can be rotated to different cutting positions, or index positions.

Figure 7:
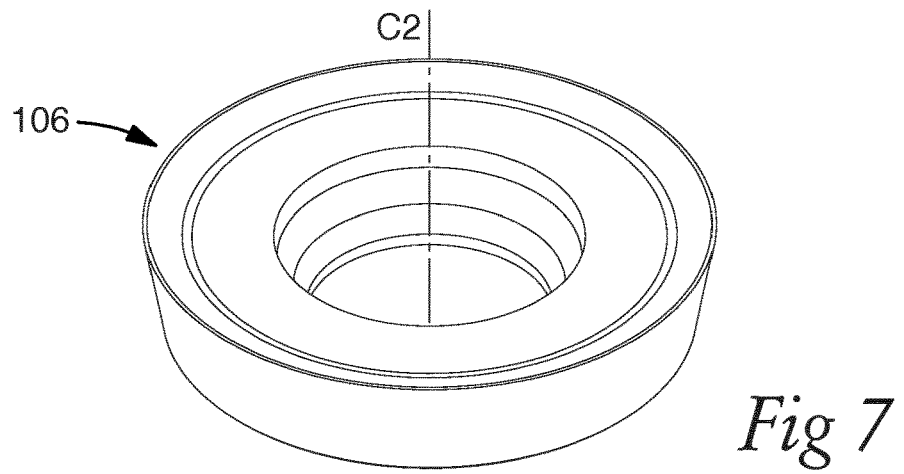
FIG. 7 shows a perspective view of a compacted powder part for forming an upper part of the cutting insert in FIG. 5.
Figure 8:
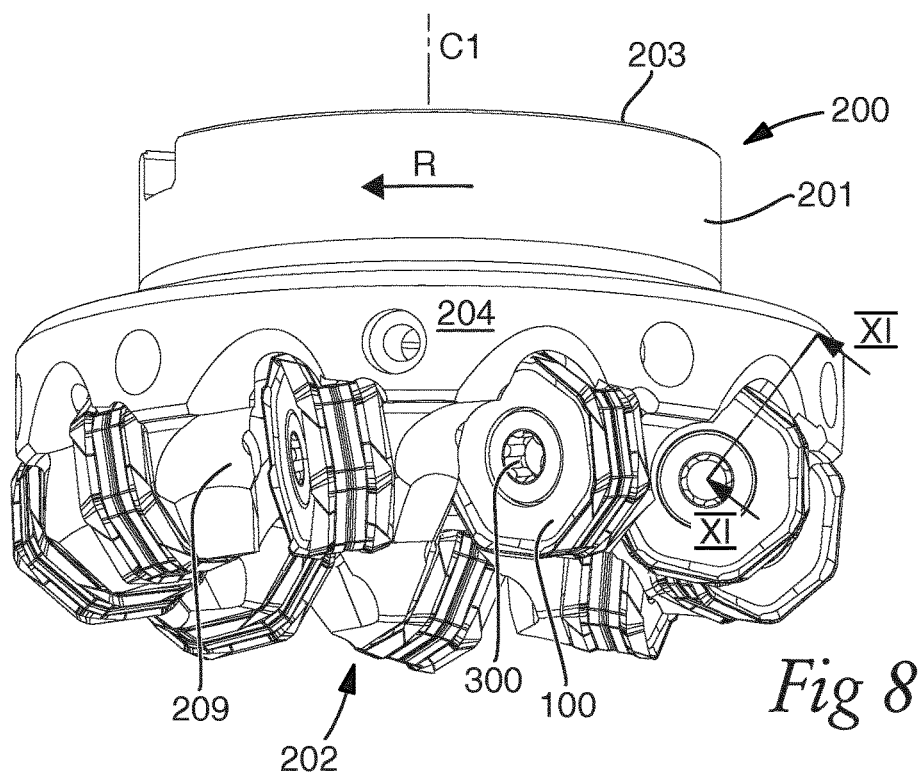
FIG. 8 shows a perspective view of a tool according to an embodiment of the invention.
Figure 9:
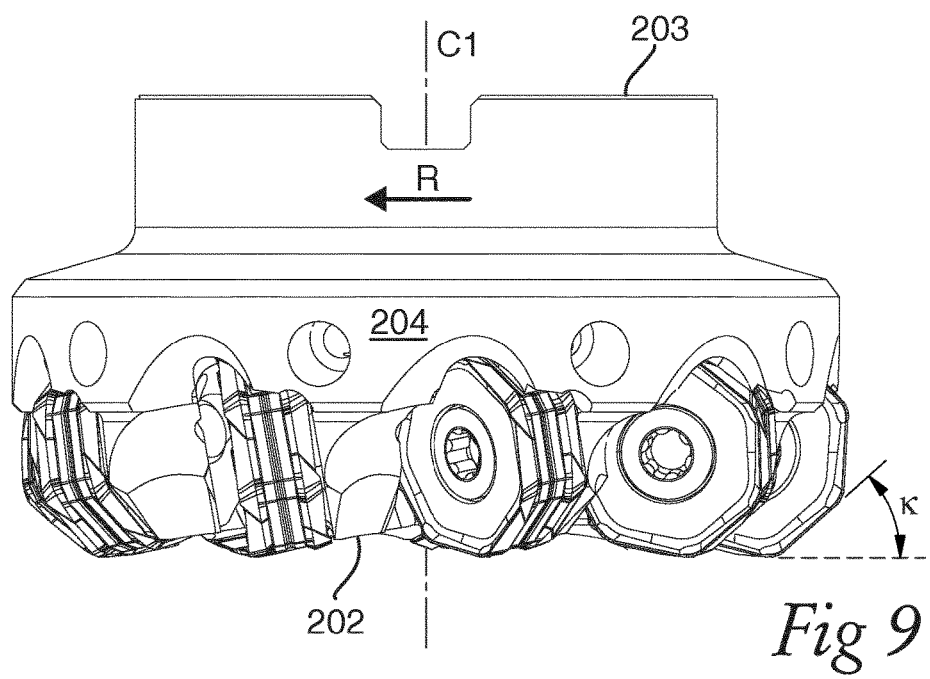
FIG. 9 shows a side view of the tool in FIG. 8.
Figure 10:
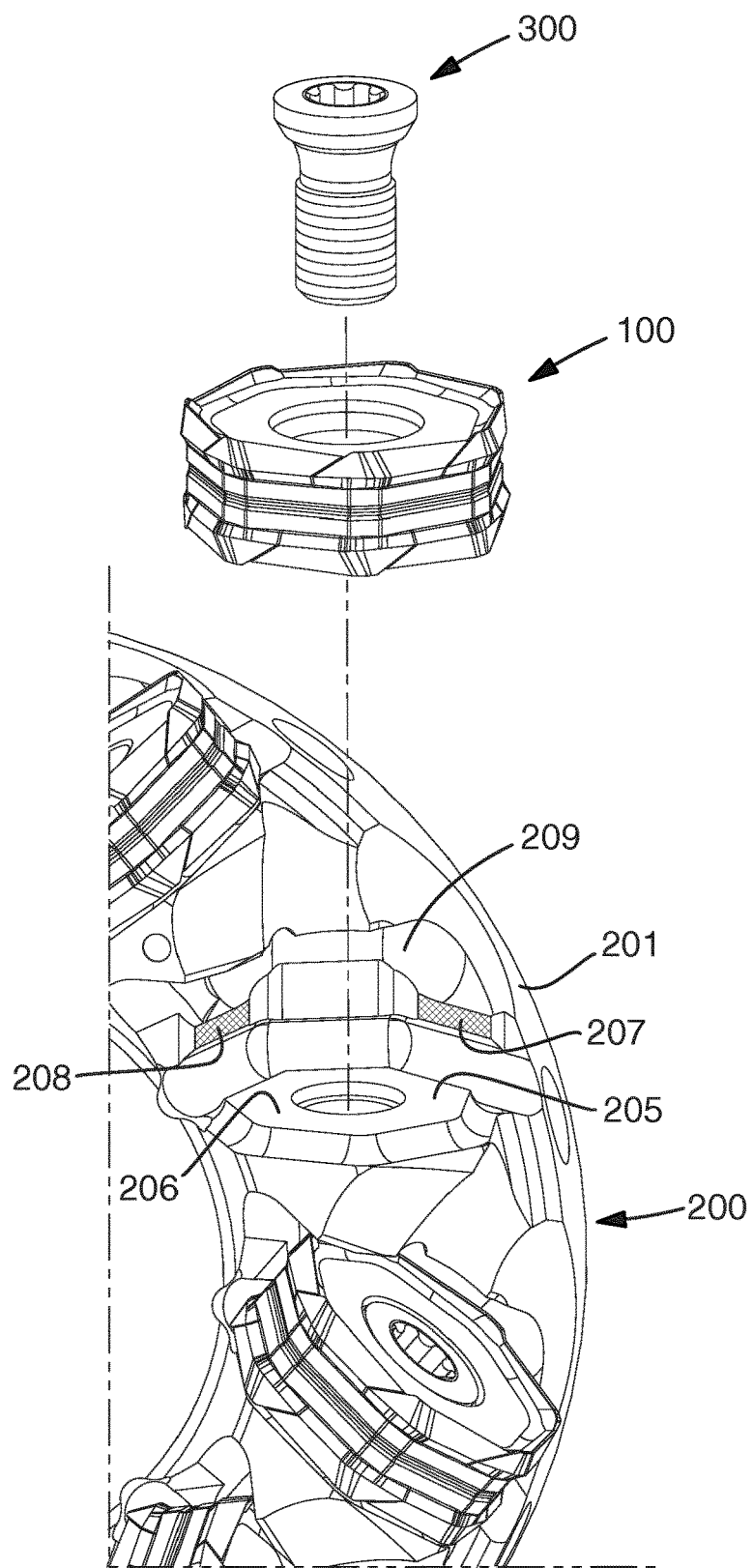
FIG. 10 shows a partial exploded view of the tool in FIG. 8.

Also in this embodiment, the cutting insert 100 is formed by sintering together two identical compacted powder parts 106 as the one shown in FIG. 7. After sintering, one of the compacted powder parts 106 forms an upper part 108 and the other part forms a lower part 109. Between the lower part 109 and the upper part 108, halfway between the upper side 101 and the lower side 102, an imaginary plane $P_I$ extends, perpendicularly to the centre axis C2. The side surface 103 is waist shaped with a waist centred on said imaginary plane $P_I$. In the second embodiment, the waist shape is provided by making the side surface inclined toward the imaginary plane $P_I$, so that a cross sectional area of the cutting insert 100 gradually decreases toward the imaginary plane $P_I$. Thus, each of the upper part 108 and the lower part 109 has the shape of a truncated cone. Centred at the imaginary plane $P_I$, a groove 113 is provided extending around the circumference of the cutting insert 100. The groove 113 has a width $w_{groove}$ groove of 0.2 mm which is about double the size of its depth $d_{groove}$, as seen in FIG. 6.

A tool 200 for chip removing machining according to an embodiment of the invention is shown in FIG. 8-11. The tool 200 is a milling tool comprising a tool body 201 and several cutting inserts 100 according to the first embodiment discussed above. The tool body 201 includes a front end 202 and a rear end 203, between which a central rotation axis C1 extends. The tool 200 is rotatable in a direction of rotation R around the central rotation axis C1 and an envelope surface 204 is concentric with the axis C1. Several insert seats 205 are formed in a transition between the front end 202 and the envelope surface 204. Each insert seat 205 comprises a bottom contact surface 206 against which the bottom support surface 116 provided on the lower side of the cutting insert 100 rests, and two side contact surfaces 207, 208 against which two of the recessed support surfaces 111a rest, providing support in the axial as well as in the radial direction of the tool 200. A chip pocket 209 is provided in front of the insert seat 205 in the direction of rotation R of the tool 200. The cutting inserts 100 are securely and detachably mounted in the insert seats 205 by means of a screw 300.

The tool 200 according to the invention is configured so that the tool body 201 contacts the side surface 103 of the cutting insert 100 only above the imaginary plane $P_I$ of the cutting insert 100, along an upper part of its side surface 103. Thus, the side contact surfaces 207, 208, in the form of an axial contact surface 207 and a radial contact surface 208, are configured to contact the recessed support surfaces 111a provided on the upper part 108 of the cutting insert 100. A clearance is provided between the lower part of the side surface 103 and the tool body 201.

Figure 11A:
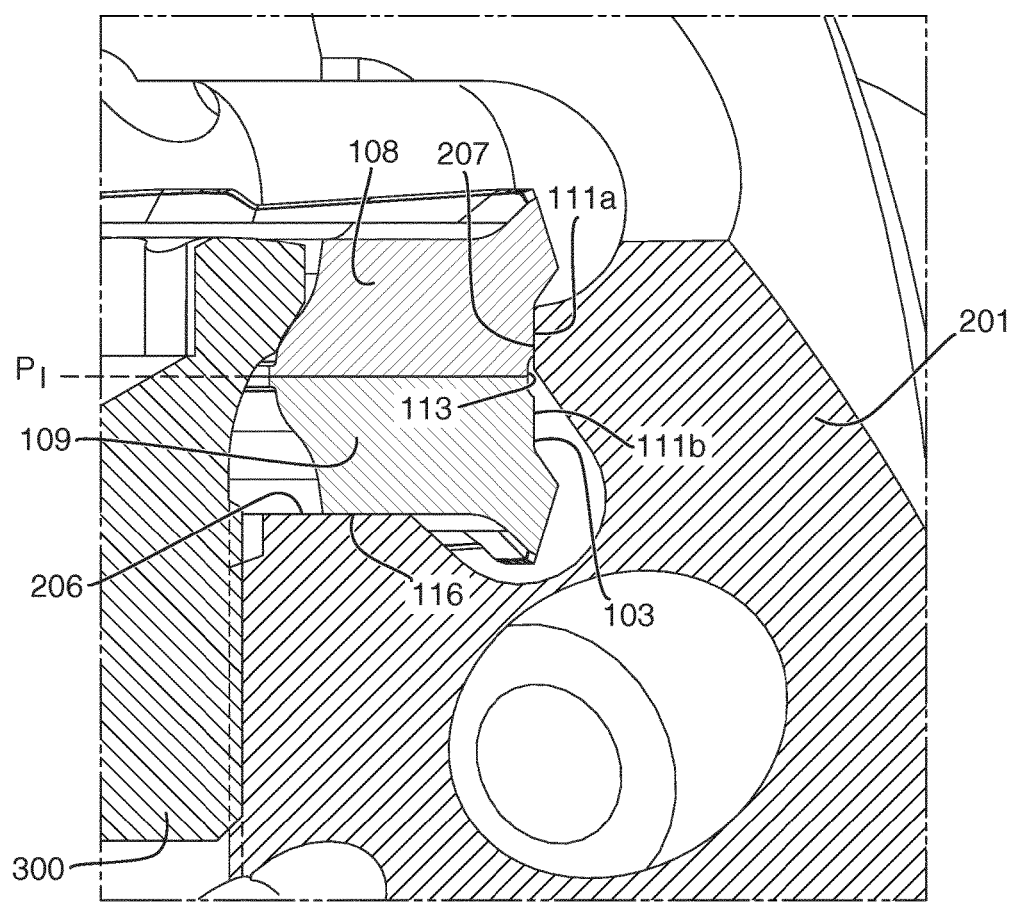
FIG. 11a shows a cross section along the line XI-XI in FIG. 8.

In one embodiment, shown in FIG. 11a, the clearance is ensured by means of the groove 113 provided in the side surface 103 of the cutting insert 100. The axial contact surface 207 does not reach past/below the imaginary plane $P_I$, but the groove provides a margin for possible fabrication errors etc. Thus, even if the axial contact surface would reach past the imaginary plane $P_I$, the tool is configured so that it does not reach past the entire groove 113.

Figure 11B:
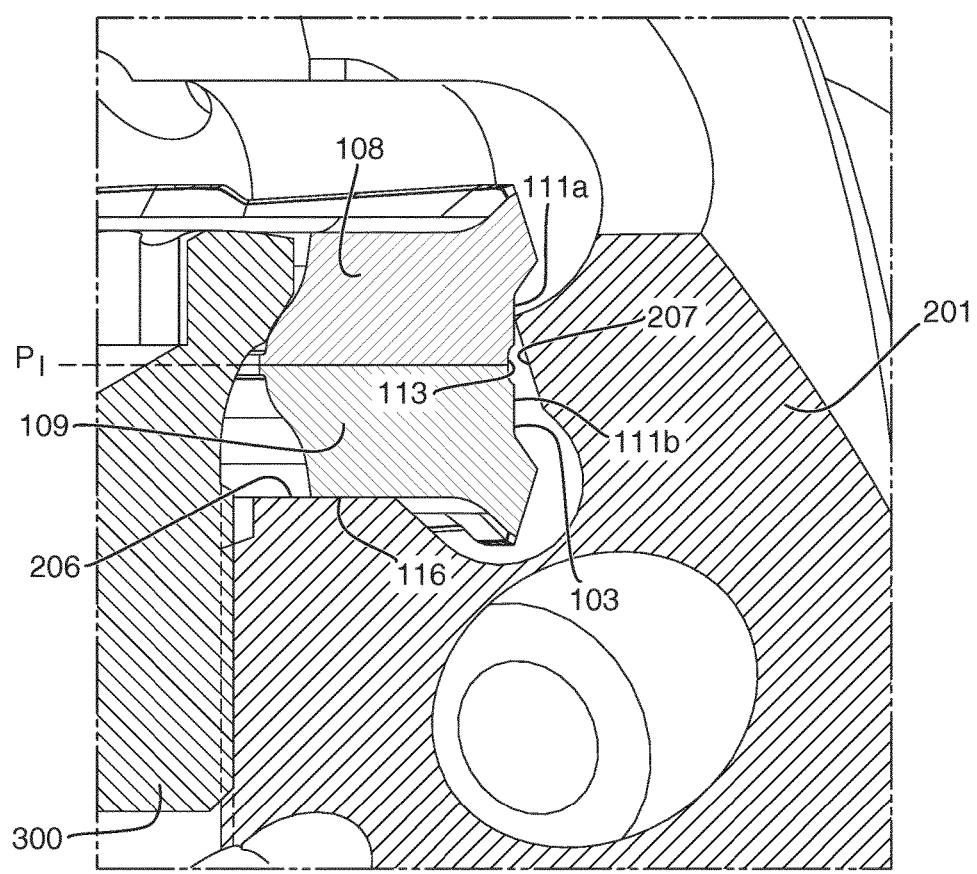
FIG. 11b shows a cross section along the line XI-XI in FIG. 8 for a slightly different configuration of the tool.

In another embodiment, shown in FIG. 11b, the clearance is achieved by means of a line contact between the contact surface 207 of the tool body 201 and the support surface 111a of the cutting insert 100. The contact surface 207 is here inclined so that it only contacts the cutting insert along a line. A large clearance is thereby provided between the side surface 103 on the lower part 109 of the cutting insert 100 and the tool body 201.

The effect of the clearance provided between the lower part of the side surface 103 and the tool body 201 is that the lower part 109 of the cutting insert 100 acts as a shim, non-active in the cutting operation as well as in supporting the cutting insert 100 in the radial and axial directions of the tool 200.

When the cutting insert 100 according to the second embodiment shown in FIG. 5-6 is mounted in the tool body of a milling tool (not shown), the cutting insert 100 is mounted with a bottom support surface provided on its lower side 102 resting against a bottom contact surface of the milling tool. The side surface 103 provided on the upper part 108 of the cutting insert 100, comprising the active cutting edge 105, rests against contact surfaces provided in the tool body. A clearance is provided between the part of the side surface 103 which is located on the lower part 109 of the cutting insert 100 and the tool body. The tool body must thus be configured so that there is no contact between the side surface 103 on the lower part 109 of the cutting insert 100 and the tool body. The contact surface or contact surfaces provided in the tool body may be configured for a line contact, a point contact or a two dimensional contact.

The present invention also relates to a compacted powder part 106 that, when sintered together with another compacted powder part, forms the upper part 108 of the cutting insert 100 according to the invention. FIG. 12 shows such a compacted powder part 106 used to form a cutting insert 100 according to the first embodiment. The compacted powder part 106 comprises a top side 125 and an interface side 115, between which a centre axis C2 extends. After sintering, the top side 125 is intended to form an upper side 101 of the cutting insert 100, and the interface side 115 is intended to abut and be joint with an interface side of a corresponding compacted powder part, intended to form the lower part 109 of the cutting insert 100. A peripheral surface 123 extends between the top side 125 and the interface side 115. Perpendicularly to the centre axis C2, the compacted powder part 106 has a cross sectional area that decreases in a direction from the top side 125 toward the interface side 115 along at least part of the compacted powder part 106, so that the resulting cutting insert is provided with a waist as described above. In the embodiment shown in FIG. 12, the reduction in cross sectional area is thus achieved by forming a discrete recess 124 in the peripheral surface 123 of the compacted powder part 106. A circumferential step 118 further reducing the cross-sectional area, and the circumference of the compacted powder part 106, is during compacting formed in a transition between the peripheral surface 123 and the interface side 115. After sintering, the step 118 and a corresponding step of the corresponding compacted powder part together form the groove 113 of the cutting insert 100.

The interface side 115 of the compacted powder part 106 can, according to one embodiment shown in FIG. 13, be in the form of a flat surface. In this embodiment, the two compacted powder parts 106 which are to form the cutting insert 100 after sintering are simply stacked on top of each other with the interface sides 115 facing each other. Using a modern pick and place robot, the positioning of the compacted powder parts 106 can be sufficiently exact.

According to another embodiment shown in FIG. 14, the interface side 115 of the compacted powder part 106 comprises two engagement members 119, 120 in the form of a protrusion 119 and a depression 120. The engagement members 119, 120 are configured to engage with corresponding engagement members of a corresponding compacted powder part and thereby prevent relative movement of the two compacted powder parts 106 as they are transported before sintering. This is also shown in FIG. 3-4. In case of a compacted powder part 106 having a circular interface side and/or a circular top side, such as shown in FIG. 7, it may be sufficient with a single engagement member per compacted powder part 106, preventing translational relative movement. For a polygonal cutting insert such as shown in FIG. 1, at least two sets of engagement members 119, 120 can be provided in order to prevent also rotational relative movement of the compacted powder parts 106.

Another embodiment is shown in FIG. 15. Here, the compacted powder part 106 is formed with several recesses 121 provided in the interface side 115, so that the cutting insert 100 formed after sintering is provided with internal cavities and is partly hollow. From each of the recesses 121 and to the peripheral surface of the compacted powder part 106, a channel 122 is provided. After sintering, the channel 122 has an orifice in the side surface of the cutting insert. Of course, the number of recesses and the design of the recesses can differ from the shown embodiment. In the shown embodiment, the compacted powder part is also provided with engagement members 119, 120 such as described above, although this is of course not necessary.

In the sintering process, it is possible that slight misalignments occur between the compacted powder parts 106, irrespective of the presence of engagement members 119, 120. Also before sintering, when positioning the compacted powder parts 106, misalignments may occur. An example of a cutting insert 100 in which the upper part 108 and the lower part 109 have been misaligned is shown in FIG. 16. The upper part 108 of the cutting insert 100 is rotationally offset with respect to the lower part 109, so that the support surfaces 111b provided on the lower part 109 of the cutting insert 100 are slightly rotated with respect to the support surfaces 111a provided on the upper part 108. However, when the misaligned cutting insert 100 is mounted in the tool body 201 of a tool 200 according to the present invention, only the support surfaces 111a provided on the upper part 108 of the cutting insert 100 are used for supporting the cutting insert 100 in the insert seat 205 when one of the upper cutting edges 105 is active. Thus, the cutting insert 100 is precisely and stably supported in the insert seat 205, even though the cutting insert 100 has misaligned upper and lower parts 108, 109.

The cutting insert according to the invention can be made of e.g. cemented carbide, such as tungsten carbide and/or titanium carbides, titanium nitrides, ceramics, or boron nitrides. The compacted powder part comprises a corresponding powder together with possible additives, which after sintering forms the desired material.

The invention is not limited to the embodiments disclosed but may be varied and modified within the scope of the following claims. For instance, the cutting insert may be single-sided with cutting edges extending only around the upper side, the insert geometry could be positive or negative, and the cutting insert may be formed with a different number of cutting edges, such as eight cutting edges or more. Furthermore, the lower part and the upper part of the cutting insert may not be equally thick. The upper side of the cutting insert may be formed with a recessed upper base surface and an inclined rake face as in the shown embodiments, or with a flat upper side including a rake face. It is furthermore not necessary that the side surface of the cutting insert is waist shaped.

The cutting insert and the tool may be designed for left hand rotation of the tool as well as for right hand rotation of the tool. The tool can also be designed for positive as well as for negative tipping-in angles and for different entering angles. Furthermore, it is not necessary that the tool and the cutting insert are intended for milling operations. Although a face milling tool is described above, the invention may also relate to a tool and a cutting insert configured for other chip-removing machining operations, such as shoulder milling, boring, drilling and turning.

The invention claimed is:

1. A tool for a chip-removing machining, comprising:
a tool body including a front end and a rear end, between which a central rotation axis extends the tool being rotatable in a direction of rotation around the central rotation axis, and at least one insert seat formed in a transition between the front end and an envelope surface extending between the front end and the rear end of the tool body, the at least one insert seat including a bottom contact surface; and
at least one cutting insert securely mounted in the at least one insert seat, the at least one cutting insert including an upper side and an opposite lower side between which a centre axis extends, wherein the lower side includes a bottom support surface directed toward the bottom contact surface of the insert seat and the upper side includes a rake face, wherein the cutting insert is formed by sintering together two compacted powder parts, one of the parts after sintering forming an upper part and the other one forming a lower part, an imaginary plane perpendicular to the centre axis being defined between the lower part and the upper part, the at least one cutting insert further including a side surface extending between the upper side and the lower side around the periphery of the cutting insert, and at least one cutting edge formed in a transition between the upper side and the side surface, the tool being configured so that the tool body contacts the side surface of the cutting insert only above the imaginary plane of the cutting insert along an upper part of the side surface, wherein the tool body is provided with an axial contact surface and a radial contact surface configured to support the cutting insert along an upper part of the side surface, the side surface including a recess centred on the imaginary plane and extending around a circumference of the cutting insert, and wherein the axial and radial contact surfaces of the tool body are configured to contact the cutting insert along at least one support surface provided within the recess.

2. The tool according to claim 1, wherein the side surface of the cutting insert is waist shaped with a waist centred on said imaginary plane.

3. The tool according to claim 1, wherein said recess has a width of 10-80% of a height of the cutting insert as measured between the upper side and the lower side.

4. The tool according to claim 1, wherein a groove is provided in the side surface of the cutting insert, centred on said imaginary plane-and extending around the circumference of the cutting insert.

5. The tool according to claim 4, wherein said groove has a width of between 0.1 mm-20% of a height of the cutting insert.

6. The tool according to claim 1, wherein said imaginary plane extends halfway between the upper side and the lower side of the cutting insert.

7. A cutting insert for mounting in a tool for chip removing machining, the cutting insert comprising:
an upper side and an opposite lower side between which a centre axis extends, wherein the upper side includes a rake face and wherein the lower side includes a bottom support surface for contacting a bottom contact surface of a tool body;
a side surface extending between the upper side and the lower side around a periphery of the cutting insert;
at least one cutting edge formed in a transition between the upper side and the side surface, wherein the cutting insert is formed by two sintered together, compacted powder parts, one of the compacted powder parts after sintering forming an upper part and the other part forming a lower part, an imaginary plane perpendicular to the centre axis being defined between the lower part and the upper part; and
a groove provided in the side surface, the groove being centred on said imaginary plane and extending around the circumference of the cutting insert.

8. The cutting insert according to claim 7, wherein the side surface is waist shaped with a waist centred on said imaginary plane.

9. The cutting insert according to claim 7, wherein a recess is centred on the imaginary plane, the recess extending around the circumference of the cutting insert and being provided in the side surface.

10. The cutting insert according to claim 9, wherein said recess has a width of between 10-80% of the height of the cutting insert as measured between the upper side and the lower side.

11. The cutting insert according to claim 7, wherein said groove has a width of between 0.1 mm-20% of a height of the cutting insert.

12. The cutting insert according to claim 7, wherein said groove has a depth of between 0.05 mm-10% of a size of the cutting insert size.

13. The cutting insert according to claim 8, wherein said recess includes a plurality of support surfaces configured to make contact with contact surfaces provided in the tool body, said support surfaces being formed at a maximum angular deviation from the centre axis of ±15°.

14. The cutting insert according to claim 7, further comprising at least one internal cavity, so that the cutting insert is at least partly hollow.

15. The cutting insert according to claim 14, wherein at least one channel is provided from said at least one internal cavity, said channel having an orifice in the side surface or in an inner circumferential surface delimiting a central through-hole formed in the cutting insert.

16. The cutting insert according to claim 7, wherein said imaginary plane extends halfway between the upper side and the lower side of the cutting insert.

17. The cutting insert according to claim 7, wherein the cutting insert is double-sided with the lower side being identical to the upper side.

18. A compacted powder part corresponding to an upper part of the cutting insert according to claim 17, the compacted powder part comprising:

a top side and an interface side between which the centre axis extends, wherein the top side is arranged to form an upper side of the cutting insert, and wherein the interface side is arranged to abut an interface side of a corresponding compacted powder part;

a peripheral surface extending between the top side and the interface side; and a circumferential step formed in a transition between the peripheral surface and the interface side, so that a circumference of the cutting insert below the step at the interface side is smaller than a circumference above the step.

19. The compacted powder part according to claim 18, wherein the interface side is flat.

20. The compacted powder part according to claim 18, wherein the interface side is formed with at least one engagement member configured to engage with a corresponding engagement member of a corresponding compacted powder part to prevent relative movement of the two compacted powder parts.

* * * * *